United States Patent [19]

Minami

[11] Patent Number: 4,471,231
[45] Date of Patent: Sep. 11, 1984

[54] ALTERNATING CURRENT FEEDER SYSTEM FOR TROLLEY-ASSISTED DUMP TRUCKS

[75] Inventor: Teruo Minami, Kawasaki, Japan

[73] Assignee: Kabushiki Kaisha Komatsu Seisakusho, Tokyo, Japan

[21] Appl. No.: 498,288

[22] Filed: May 26, 1983

[30] Foreign Application Priority Data

May 27, 1982 [JP] Japan ............................ 57-76949[U]

[51] Int. Cl.³ .............................................. H02J 3/00
[52] U.S. Cl. ...................................... 307/17; 307/83; 323/361; 191/3
[58] Field of Search ................... 307/17, 83, 145, 147; 104/289, 291; 246/249, 254; 323/361; 191/2, 3, 39

[56] References Cited

U.S. PATENT DOCUMENTS 1,292,578  1/1919  Chernyshoff ................. 307/83 X
3,290,510  6/1963  Rose ............................. 307/83 X
3,600,597  8/1971  Swerdlow ...................... 307/17
3,671,901  6/1972  Lys .

Primary Examiner—E. A. Goldberg
Assistant Examiner—Derek Jennings
Attorney, Agent, or Firm—Armstrong, Nikaido, Marmelstein & Kubovcik

[57] ABSTRACT

An alternating current feeder system for use in trolley assisted dump trucks has a feeder circuit of a.c. system including a Scott connection transformer used as a main substation, main- and T-winding sections having a phase difference of 90 degrees on the secondary side of the transformer and serving to transform three-phase a.c. power into single phase one supplied to feeder substations, single phase transformers respectively installed in the feeder substations, each being adapted to drop the voltage applied on trolley wires to the level required for the latter, and a different phase section provided in a boundary defined between the single phase transformers.

3 Claims, 5 Drawing Figures

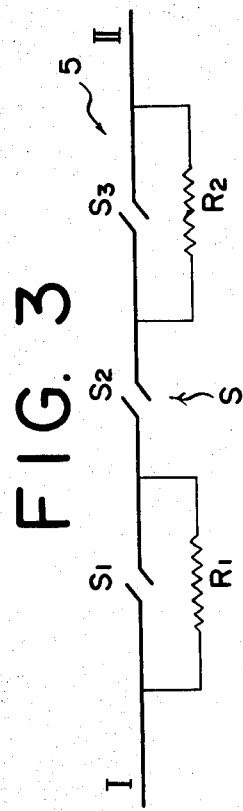
FIG. 3
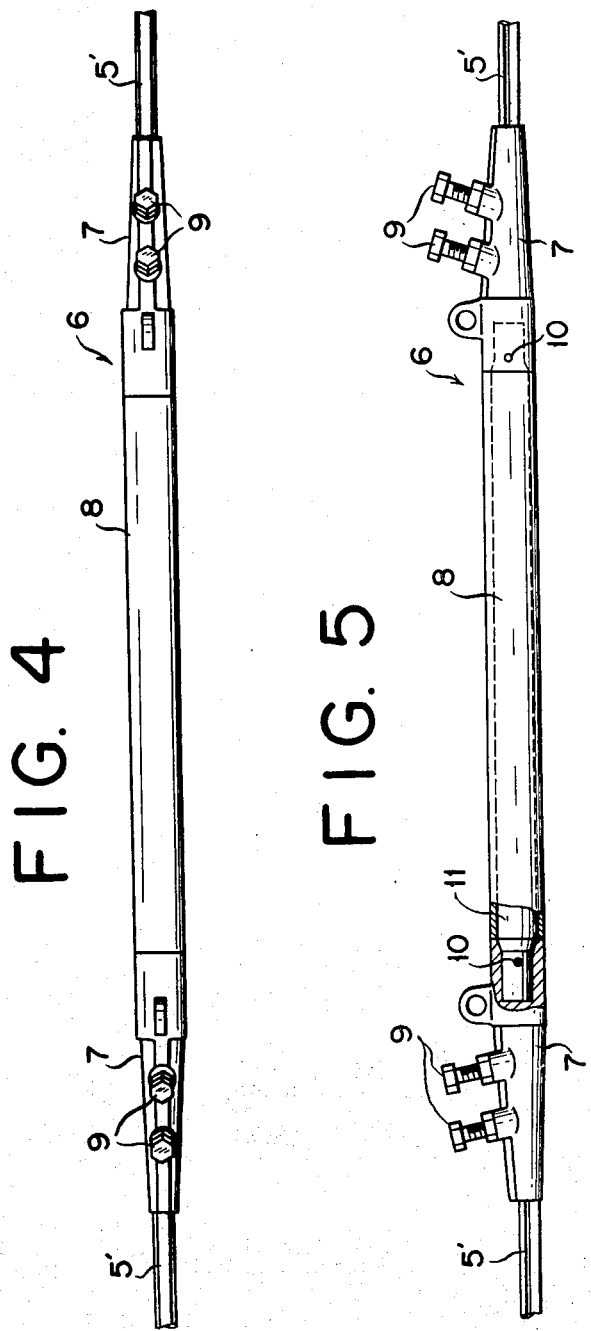
FIG. 4
FIG. 5

ALTERNATING CURRENT FEEDER SYSTEM FOR TROLLEY-ASSISTED DUMP TRUCKS

BACKGROUND OF THE INVENTION

This invention relates to a feeder system for trolley-assisted dump trucks, and more particularly to an alternating current feeder system for use in a feeder circuit of a.c. system for trolley-assisted dump trucks.

In view of the availability of petroleum becoming tight increasingly in the late years, there is a relevant tendency towards energy saving even at large-scale mines. In particular, in the district where ample power can be generated by hydraulic power and by thermal power obtained by burning coals, but is lacking in petroleum resources, there can be seen a strong demand for electrization of mining machinery with a view to saving petroleum resources.

In addition to the petroleum saving tendency, there can be seen a tendency towards reduced productivity due to the suspension of movements of vehicles so as to prevent a pit of the mine from oxygen deficient condition arising from the exhaust gas smog emitted from the engines of ore carrying trucks and the amount of which increases as the pit becomes deeper.

In order to eliminate such difficulties of late years, there has been proposed and emloyed a double-wire trolley-assisted dump truck system making use of the cheap commercial power supply in the ascent courses from the bottom of the pit to a dumping area.

In a feeder circuit for trolley-assist, the power for operation is supplied from a substation to one of trolley wires, and then it will pass through current collectors so as to move the running motors of electrically driven dump trucks, and through the other of trolley wires, back to the substation again.

This feeder circuit is classified into two system, namely, a direct current system and an alternating current system. In the case the alternating current system is employed, there is no need of provision of transformers in the substantion, and so the equipment is simplified. However, when an alternating current feeder system is employed in the single phase trolley-assist system, the single phase load is taken from the three phase power supply network so as to cause an unbalanced voltage on the side of three-phase, thus causing in extreme cases temperature rises in the induction motors and generators connected with the three phase power supply network system and giving other bad influences to them.

It is well known that if a Scott connection is used in the transformer to convert three-phase into single phase to prevent such troubles, then a balanced single phase direct current voltage is induced on the secondary circuit, even if a balanced three phase alternating current is supplied in the primary feeder circuit.

In case the Scott transformer is used, the phase difference between the first circuit and the secondary circuit is 90 degrees, and so it is necessary to provide a non-voltage applied section in the feeder circuit, which section being referred to If the different phase sections are provided on the ascents in the pit of mine, there have occurred troubles wherein when a dump truck passes from the first feeder section through the non-voltage applied section, its running speed will reduce so that it is necessary to allow high electric current flow through its motor when the truck has entered the second feeder section thus causing heat generation and fusion of trolley wires and abnormal wear of pantagraphs and sliders, and also because there is a phase difference of 90 degrees between the first feeder section and the second feeder section, if the dump truck under current collecting condition is allowed to enter the different phase section, then a big arc will occur thereby damaging the pantagraphs and sections.

SUMMARY OF THE INVENTION

This invention has been contemplated in view of the above-mentioned circumstances, and has for its object to provide an alternating current feeder system for use in trolley-assisted dump trucks wherein the need of cutting off high electric current in the dead sections of different phase sections in the alternating current feeder circuit is eliminated thereby reducing the arc generation rate so that such troubles as damages of pantapraphs and sections can be eliminated.

In order to achieve the above-mentioned object, according to the present invention, there is provided an current feeder system for use in trolley-assisted dump trucks, characterized by comprising a Scott connection transformer used as a main substation, a main winding section and a T-winding section which have a phase difference of 90 degrees on the secondary side of said transformer and which serve to transform three phase a.c. power supplied thereto into single phase a.c. power which is in turn supplied to a plurality of feeder substantions, a plurality of single phase transformers installed in said feeder substations respectively, each being adapted to drop the voltage applied on trolley wires to the level required for the latter, and a different phase section provided in the boundary defined between the single phase transformers.

Further according to the present invention each of the above-mentioned different phase sections comprises three short sections, the first and third sections thereof each having a current limiting resistance, and a dead section located between said first and third sections and which is longer than the dimension of the collector shoe of a phantagraph by a necessary amount.

Still further, according to the present invention, in each of the above-mentioned different phase sections there is located a section insulator which comprises a fibre reinforced plastic body shielded and reinforced by a ceramic protective tube.

BRIEF DESCRIPTION OF THE DRAWINGS

The above and many other advantages, features and additional objects of the present invention will become manifest to those skilled in the art upon making reference to the following detailed description and accompanying drawings in which preferred structural embodiments incorporating the principles of the present invention are shown by way of illustrative example.

FIG. 3 is an explanatory view of the arrangement of a different phase section in the circuit of the feeder system according to the present invention;

FIG. 4 is a plan view of a section insulator used in the feeder system of the present invention; and FIG. 5 is a side elevational view of the section insulator shown in FIG. 4.

DETAILED DESCRIPTION OF THE INVENTION

Figure 1:
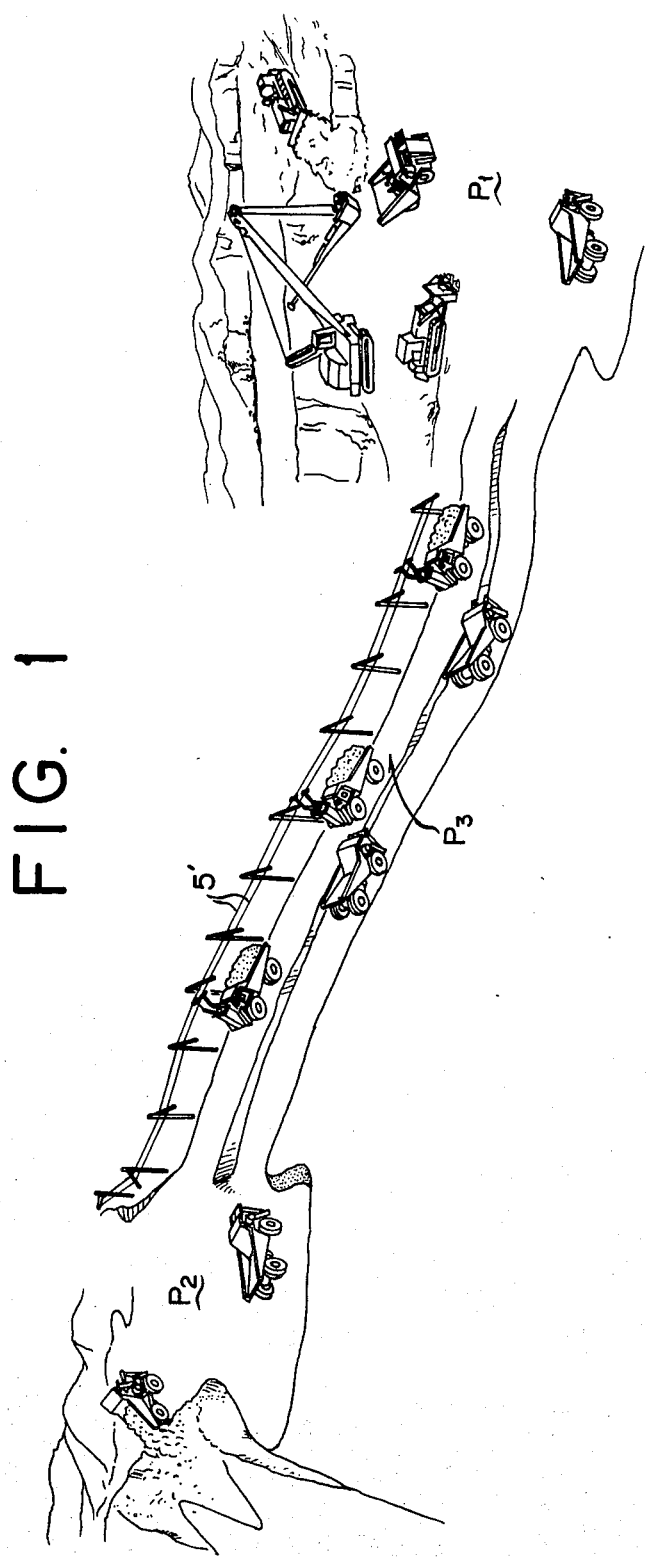
FIG. 1 is an explanatory view of the working condition in a trolley-assisted dump truck application system according to the invention of the present application.

In FIG. 1, there is depicted a dump truck practical application system of double-trolley-assisted type laid from a pit $P_1$ (a loading area) of a mine through a slope $P_3$ to a dumping area $P_2$. As can be seen from FIG. 1, the trolley assisted system is employed only on the ascent, and when dump trucks run on flat roads and descents with low fuel consumption, they utilize the power generated by the engines mounted on them.

Figure 2:
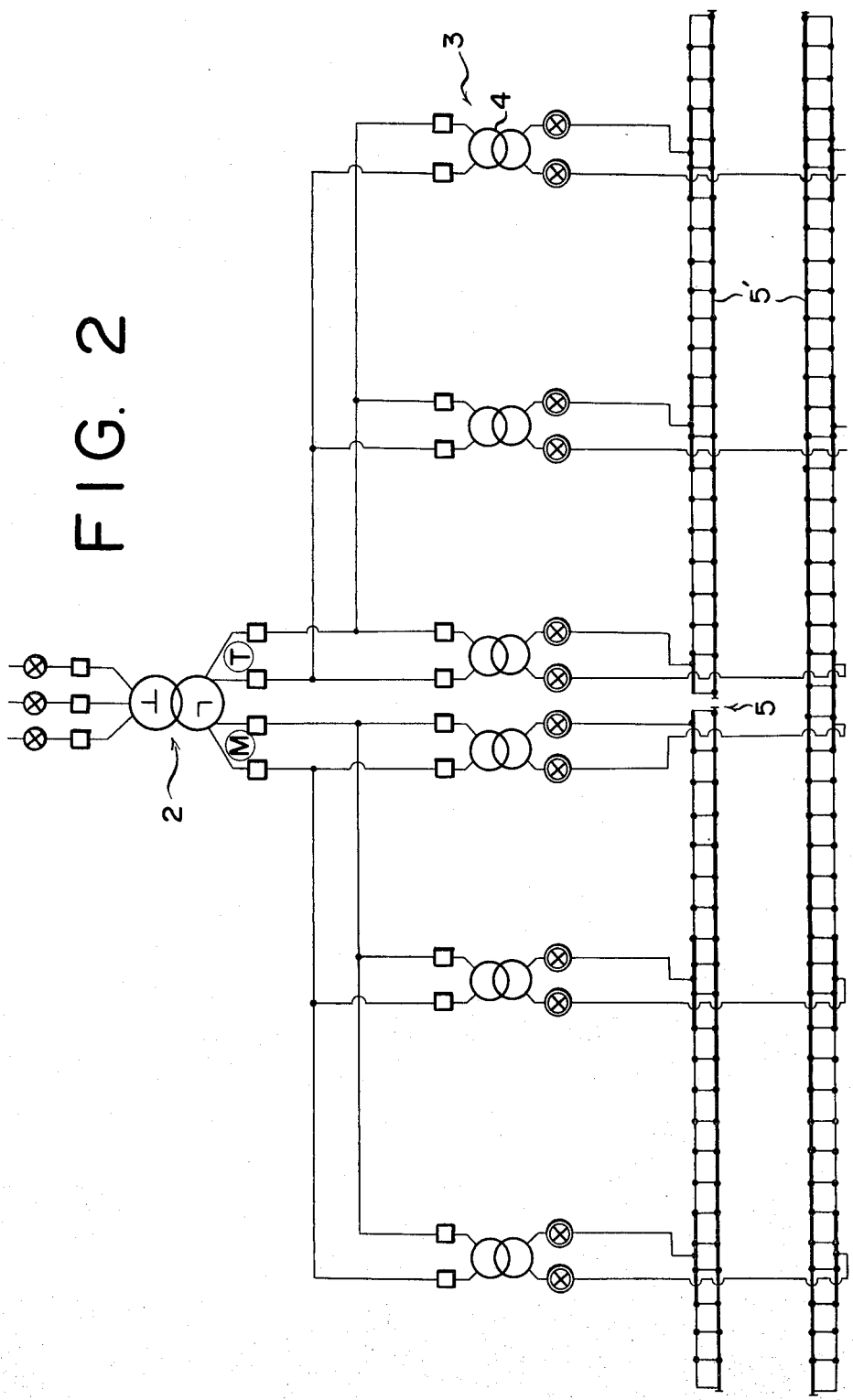
FIG. 2 is an explanatory view of the arrangement of one embodiment of a feeder system according to the present invention.

With reference to FIG. 2, the power from the commercial power source of three phase 66 KV is received by a main substation and is converted by a Scott connection transformer 2 into the power of single phase 33 KV which is out-of-phase of 90 degrees and which is then supplied to feeder substations 3 in several places.

At the feeder substations 3, the single phase 33 KV power is transformed by a single phase transformer 4 into a power of single phase 1,400 volts which is supplied to trolley wires 5'.

Stated in brief, the Scott connection transformer 2 is employed at the main substation for the purpose of reducing the power source unbalance due to the single phase load. A single phase a.c. power which is out-of-phase of 90 degrees is generated by way of secondary main winding section (M) and T-winding section (T) and is supplied to the feeder substations 3 where its voltage is reduced by the single-phase transformer 4 to the level required for the trolley wires 5'. A different phase section 5 is provided in the boundary between the single phase transformers 4 for feeding power installed after the Scott connection transformer 2 at the main substation.

This different phase section 5 is arranged as mentioned hereinafter for the purpose of reducing the nonvoltage applied section as much as possible and preventing the occurrence of arc.

With reference to FIG. 3, short sections $s_1$ and $s_3$ are provided between a first feeder section I and a second feeder section II which are out of phase, and current limiting resistances $R_1$ and $R_2$ are inserted in parallel with the sections $s_1$ and $s_3$. By this arrangement, when a dump truck coming from the first feeder section I while it is collecting current enters the nonvoltage applied section S, it will pass through a dead section $s_2$ with the current therethrough being limited by the current limiting resistance $R_1$. When the dump truck has passed through the dead section $s_2$ without any voltage application, it will be supplied with electric current through the current limiting resistance $R_2$. Accordingly, it is not necessary to cut off the high electric current at the dead section $s_2$, and so the arc generation rate is reduced. As a result, such troubles as damages of pantagraphs and sections can be eliminated.

As regards the material of the section $s_1$, $s_2$ and $s_3$ used for such a difference phase section 5, a section insulator 6 with a ceramic protective tube shown in FIG. 4 should desirably be used. Further, the dimensions of the section insulators 6 used for the sections $s_1$ and $s_3$ may be narrower than the width of the collector shoe of the pantagraph. It is evident that if the dimension of the dead section $s_2$ is adjusted to regulate the resistance value so that the arc generation rate may be minimized then the dead section $s_2$ may be somewhat wider than the width of the collector shoe of the pantagraph.

The above-mentioned section insulator 6 comprises, as shown in FIGS. 4 and 5, an insulator body 11 made of fiber reinforced plastic and a pair of clamp bodies 7, 7 made of brass and each mounted on each end of the insulator body 11 by means of a pin 10. Each of the clamp bodies 7, 7 has a screws 9, 9 for connecting themselves with the trolley wires 5', respectively. Further, mounted on the insulator body 11 is a ceramic protective tube 8 for the purpose of reinforcement thereof.

It is to be understood that the foregoing description is merely illustrative of a preferred embodiment of the present invention and that the invention is not to be limited thereto, but is to be determined by the scope of the appeded claims.

What is claimed is:

1. An alternating current feeder system for use in trolley assisted dump trucks, characterized by comprising a Scott connection transformer used as a main substation, a main winding section and a T-winding section which have a phase difference of 90 degrees on the secondary side of said transformer and which serve to transform three-phase a.c. power supplied thereto into single phase a.c. power which is in turn supplied to a plurality of feeder substations, a plurality of single phase transformers installed in said feeder substations, respectively, each being adapted to drop the voltage applied on trolley wires to the level required for the latter, and a different phase section provided in the boundary defined between said single phase transformers.

2. The alternating current feeder system for use in trolley assisted dump trucks as claimed in claim 1, characterized by that each of said different phase sections comprises three short sections, the first and third sections thereof each having a current limiting resistance, and a dead section located between said first and third sections and which is longer than the dimension of the collector shoe of a pantagraph by a necessary amount.

3. The alternating current feeder system for use in trolley assisted dump trucks as claimed in claim 1, characterized by that in each of said different phase sections there is located a section insulator which comprises fiber reinforced plastic body shielded and reinforced by a ceramic protective tube.

* * * * *